Patented Nov. 4, 1952

2,616,818

UNITED STATES PATENT OFFICE 2,616,818

PAPER COATING

Julian L. Azorlosa, Wilmington, Del., assignor to Hercules Powder Company, Wilmington, Del., a corporation of Delaware No Drawing. Application November 18, 1948, Serial No. 60,826

3 Claims. (Cl. 117—155)

This invention relates to a coated paper and to a composition of matter and process useful therefor.

In the preparation of a coated paper, it is conventional to prepare a mixture of water and a pigment such as clay or the like, optionally together with other materials such as, for example, a soluble pyrophosphate which may act as a dispersing and stabilizing agent. This mixture, otherwise known as a pigment slip or, since it generally contains clay, as a clay slip, is then compounded with a binder or adhesive material to produce a composition known in the art as a coating color which is useful for coating a cellulose web. Considerable quantities of the binder are used, and, accordingly, the composition and characteristics of the binder are of great importance in determining the qualities of the finished paper. Important properties of the binder are that they must impart to the coating color or to the finished paper a high degree of brightness, smoothness and gloss, and a good finish and feel after calendering. In addition to these basic qualities required in coatings, there are various further characteristics that go far toward determining the value and utility of coating adhesives: (1) the coating color must flow smoothly and evenly so that it may be applied to paper at sufficiently high speeds to be economical in ordinary coating processes; (2) the coating must have high strength, to permit subsequent printing on the coated paper without "picking"; and (3) the coating must have a high wet-rub resistance for uses wherein the coated paper is treated with water as, for example, in off-set printing. It has previously been difficult to find a satisfactory adhesive or binder which is favorably adapted for these critical needs and which, at the same time, is economically available.

Now in accordance with the present invention, there is utilized as a coating adhesive a composition of matter comprising a polymer prepared from a predominant proportion of acrylamide, optionally together with a minor proportion of a copolymerizable acrylic compound. In operating according to this invention, a coating adhesive is prepared by mixing a clay or pigment with the polymer in aqueous suspension to yield a coating color which is thereafter applied to a paper web or the like. According to one specific embodiment of the invention, the coated paper may be treated with a cross-linking agent such as glyoxal whereby a high degree of water insolubility and water resistance is imparted to the coated paper. The polymer may be prepared from the amide monomer alone or it may be prepared from a major proportion of the amide monomer together with up to one-third molecular proportion of a polymerizable material such as, for example, a polymerizable acid or the like.

The general nature of the invention having been set forth hereinbefore, the following examples are now presented in illustration, but not in limitation thereof.

EXAMPLE 1

A water solution of polyacrylamide was prepared by refluxing 60 parts of acrylamide, 100 parts of isopropanol, 0.88 part of 68% cumene hydroperoxide, and 540 parts of water adjusted to pH 8.5 with 10% sodium hydroxide. The mixture was refluxed for two hours and the resulting polymer solution was then concentrated by heating on a steam bath under 20 mm. pressure. The concentration was continued to yield a thick residue which was then made up to 25% solids by the addition of water. The Gardner viscosity of the 25% solution was slightly less than "0", or about 360 c. p. s., and the pH was about 6.4.

A 72% solids clay slip was prepared by mixing 100 parts of pulverized clay with water and 0.5% sodium pyrophosphate. To 100 parts (based on total solids) of this clay slip was added 9 parts (based on total solids) of the polyacrylamide solution as prepared above yielding a coating color containing 9% adhesive based on the weight of clay. This coating color was characterized by a low viscosity, favoring use with high-speed coating procedures. The resulting mixture was made up to 62.4% solids and was stirred several minutes and passed through a 60-mesh screen to insure the absence of undispersed clay agglomerates. A bleached sulfite moderately-sized web was coated with the thus prepared coating color and the coated web then dried at room temperature. The coated paper had an excellent finish and gloss, and the color was bright and smooth.

The air-dried sheets as prepared above were conditioned for two days at 23° to 24° C. and 50% relative humidity to bring test sheets to a uniform condition, and the coating adhesive strength was tested according to the standard Dennison Wax Test. The results of the tests are indicated in Table I, in comparison with a control sample using 20% starch as binder.

EXAMPLE 2

The procedure of Example 1 was repeated using a coating color containing 11% polyacrylamide based on the weight of clay. The product was a coated sheet having good color, finish and printing properties. Test sheets were prepared according to the test procedure of Example 1 for the Dennison Wax Test, with test results as shown in Table I.

EXAMPLE 3

A water solution of a copolymer of acrylamide and acrylic acid was prepared by refluxing 54 parts of acrylamide and 6 parts of acrylic acid in 100 parts of isopropanol and 540 parts of water adjusted to 8.5 with 10% sodium hydroxide in the presence of 68% cumene hydroperoxide. The product was concentrated and then diluted according to the procedure of Example 1 to yield a 25% solution having a Gardner viscosity of about "O".

The thus prepared copolymer solution was utilized to prepare a coating color which then was coated on paper according to the precedure of Example 1. The thus treated paper was air dried at room temperature to yield a paper product characterized by highly satisfactory color, brightness, coating strength and finish.

Table I

| Example | Polymer Composition | Coating Color Solids (Percent) | Percent Binder, Based on Wt. of Clay | Dennison Wax Test |
|---|---|---|---|---|
| 1 | 100% polyacrylamide. | 62.4 | 9 | 6+ |
| 2 | 100% polyacrylamide. | 60.0 | 11 | 7− |
| 3 | 90% acrylamide, 10% acrylic acid. | 62.4 | 9 | 5+ |
| Control | Starch | | 18 | 2− |

EXAMPLE 4

The coating color of Example 1 was modified by the addition thereto of 5% glyoxal and 2% potassium bicarbonate based on the dry weight of the copolymer. This modified coating color was coated on a moderately sized cellulosic paper which was then dried at 98–99° C. for 30 minutes. During the drying period carbon dioxide was released from the coating and a highly water-insoluble coating was formed.

A rough but adequate test of the wet-rub resistance of the coated paper was utilized to test the coated sheets in comparison with control coated sheets using 20% starch as the coating color adhesive. According to this rough test, the operator moistened a suitable surface with water and rubbed this surface across the coated side of the paper and then placed the test surface against a piece of black paper. The amount of coating color which was rubbed off the paper onto the test surface and subsequently transferred to the black paper was a qualitative indication of the wet-rub resistance of the paper and indicated adequately whether the wet-rub resistance of the paper could be classified as poor, fair, good or excellent.

The coated paper prepared according to this example showed a wet-rub resistance of "excellent" according to this test, as compared with a wet-rub resistance of "good" for a coating containing 13% casein and a wet-rub resistance of "poor" for a coating containg 20% starch.

The new coating color composition according to this invention comprises an aqueous mixture of a pigment or a clay slip with a binding material such as is described in the examples, the binding material being a vinyl-type polymer or copolymer prepared from a predominant proportion of acrylamide; namely, polyacrylamide itself or a copolymer of at least 2/3 molecular proportion acrylamide with a compatible copolymerizable monomer such as, for example, the corresponding free acid, nitrile, or the like. Thus, satisfactory copolymers may be prepared utilizing a predominant proportion of the amide monomer and a minor proportion of another monomer such as, for example, up to 1/3 molecular proportion of acrylic acid or the like together with the acrylamide.

For optimum results in the coating of paper, it is preferred to prepare a coating color having a total solids composition which is relatively high, thus providing good surface coating qualities and economical operation. A preferred range of total solids for the coating color is between about 30 and 70% solids with an optimum value at about 50–65%. The amount of the binder in the coating color is maintained between about 5 and about 15%, based on the weight of clay, and preferably between about 6 and about 10%. A composition containing an amount of total solids and binder in this range is characterized by being readily applied to the surface of the paper and by forming a highly resistant coating thereon. Utilizing the coating color according to this invention, there is produced a coated paper with highly satisfactory primary qualities such as color, brightness, smoothness, gloss, and the like, and which is highly satisfactory for use in printing operations and is resistant to disturbance of the clay coating surface through rubbing, picking, and the like.

In a preferred embodiment of this invention, the paper which has been coated by means of the coating color described herein is subjected to a further treatment causing the binder to become insolubilized and, accordingly, more resistant to the effects of water and the like. Thus, the binding composition containing a polymer having a large number of amide groups in its structure was treated with an insolubilizing agent or a cross-linking agent such as a solution containing a significant amount of glyoxal or its equivalent, thereby rendering the adhesive highly insoluble and strongly adhesive.

The preferred procedure for insolubilizing the coating for the preparation of a high wet-rub resistance coating comprises adding to the coating between about 1% and about 5%, preferably between about 2% and about 4% glyoxal, based on the weight of copolymer. This modifier, during normal coating and drying treatment, reacts with the copolymer to form a highly insoluble coating favoring use of the coated paper in operation contemplating moistening of the paper. If desired, the insolubilization of the polymer may be expedited by treating the coated paper with an alkaline material, for example, by passing the coated paper through an aqueous alkaline bath. Alternatively, a suitable alkaline compound may be incorporated directly in the coating color, for example, as shown in Example 4 where potassium bicarbonate was employed. This compound decomposes at normal paper drying temperatures of about 90 to 120° C., giving off carbon dioxide and raising the coating pH to about 9 or higher, while maintaining in the liquid coating color before drying a pH below 8.5. Accordingly, by this treatment, gelation or coagulation of the liquid coating color is avoided whereas insolubilization of the dry coating is promoted. Suitable substitutes for glyoxal may of course be used, including recognized chemical equivalents thereof.

The pigment material which is utilized in the coating color comprises one of the conventional paper coating materials such as, for example, a pulverized clay or the like. For higher quality or special types of paper there may be substituted therefor other known pigment materials such as, for example, calcium sulfate, titanium dioxide, satin white or other coating pigments alone, or preferably with a clay base. The modification of the coating color using these materials will be within the knowledge of those skilled in the art and it is to be understood that the pigment material as contemplated herein includes any or all of these materials.

The utility of applicant's invention is not limited to the particular type of paper pulp used, and, accordingly applicant's invention may be utilized with the various types of kraft, soda, sulfite pulp, and the like as well as with various other chemical and semichemical paper pulps. By the same token, the invention may be utilized with various types of paper products such as paper, fiber board, molded pulp products, and the like. In all instances, the product produced by applicant's invention is characterized by being relatively resistant to abrasion and by having a surface of fine quality and improved printing properties.

This application contains subject matter which is claimed in my copending application Serial No. 60,827 filed November 18, 1948.

What I claim and desire to protect by Letters Patent is:

1. In a process for preparing a coated paper, the step comprising applying to a preformed paper web an aqueous dispersion of clay containing between about 50 and about 65% total solids and, as an adhesive, between about 6 and about 10% polyacrylamide based on the weight of clay, said dispersion containing glyoxal to render the adhesive substantially insoluble in water.

2. In a process for preparing a coated paper, the step comprising applying to a preformed paper web an aqueous dispersion of clay containing between 30% and about 70% total solids and as an adhesive between about 5% and about 15%, based on the weight of clay, of a water-soluble polymer selected from the group consisting of polyacrylamide and copolymers of acrylamide and a copolymerizable monomer in which the molar proportions of acrylamide to the other monomer are at least 2 to 1, said dispersion containing glyoxal to render the adhesive substantially insoluble in water.

3. In a process for preparing a coated paper, the step comprising applying to a preformed paper web an aqueous dispersion of clay containing between about 30% and about 70% total solids and as an adhesive between about 5% and about 15% of water-soluble polyacrylamide based on the weight of clay, said dispersion containing glyoxal to render the adhesive substantially insoluble in water.

JULIAN L. AZORLOSA.

REFERENCES CITED

The following references are of record in the file of this patent:

UNITED STATES PATENTS

| Number | Name | Date |
| --- | --- | --- |
| 2,078,881 | Munzinger | Apr. 27, 1937 |
| 2,173,005 | Strain | Sept. 12, 1939 |
| 2,287,161 | Ball | June 23, 1942 |
| 2,343,095 | Smith | Feb. 29, 1944 |
| 2,469,696 | Minsk et al. | May 10, 1949 |

FOREIGN PATENTS

| Number | Country | Date |
| --- | --- | --- |
| 475,671 | Great Britain | Nov. 24, 1937 |